(12) United States Patent
Chang

(10) Patent No.: US 8,573,879 B2
(45) Date of Patent: Nov. 5, 2013

(54) QUICK-RELEASE DEVICE

(76) Inventor: Chin-Chao Chang, Taichung (TW)

( * ) Notice: Subject to any disclaimer, the term of this patent is extended or adjusted under 35 U.S.C. 154(b) by 304 days.

(21) Appl. No.: 13/214,150

(22) Filed: Aug. 19, 2011

(65) Prior Publication Data

US 2012/0321373 A1    Dec. 20, 2012

Related U.S. Application Data

(63) Continuation-in-part of application No. 13/160,508, filed on Jun. 15, 2011.

(51) Int. Cl.
*B25G 3/18* (2006.01)

(52) U.S. Cl.
USPC .................................. 403/322.4; 301/124.2

(58) Field of Classification Search
USPC ........ 403/322.1, 322.4, 374.1, 375.5, DIG. 4; 301/124.2; 280/279, 288.4
See application file for complete search history.

(56) References Cited

U.S. PATENT DOCUMENTS

| | | | | |
|---|---|---|---|---|
| 5,823,555 A * | 10/1998 | Ashman | ........................ | 280/279 |
| 7,090,308 B2 * | 8/2006 | Rose et al. | .................. | 301/110.5 |
| 7,673,947 B2 * | 3/2010 | Chang | ........................ | 301/124.2 |
| 8,186,768 B2 * | 5/2012 | Spahr | ........................ | 301/124.2 |
| 2010/0109425 A1 * | 5/2010 | Montague et al. | ......... | 301/124.2 |
| 2013/0033096 A1 * | 2/2013 | Howes | ....................... | 301/124.2 |

* cited by examiner

*Primary Examiner* — Michael P Ferguson
*Assistant Examiner* — Daniel Wiley

(57) ABSTRACT

A quick-release device includes a shank and a flange radially extending from one end of the shank. A ring is sleeved on the shank and engaged to the flange. A sleeve is co-axially connected and engaged to the ring. A washer is received in the sleeve. A shaft is co-axially connected to the shank and sequentially extending through the ring, the sleeve and the washer. A pivot is transversely mounted to a distal end of the shaft and abutting the washer. A lever is pivotally mounted onto the pivot for selectively forcedly and inwardly pushing the washer and engaged to the sleeve.

5 Claims, 7 Drawing Sheets

QUICK-RELEASE DEVICE

CROSS-REFERENCE TO RELATED APPLICATION

This application is a continuation-in-part application of U.S. patent application Ser. No. 13/160,508, filed Jun. 15, 2011, and entitled "QUICK-RELEASE DEVICE", now pending, the contents of which are included herein by reference.

BACKGROUND OF THE INVENTION

1. Field of the Invention

The present invention relates to a quick-release device, and more particularly to a quick-release device that includes a lever selectively driving a tubular structure thereof for detaching the quick-release device when being released.

2. Description of Related Art

A conventional quick-release device in accordance with the prior art shown in FIGS. 5 and 6 is adapted to be mounted on a fork (4), wherein the fork (4) includes a tube (41) having a through hole (410) defined in a free end thereof to allow the quick-release device extending through the tube (41).

The conventional quick-release device includes a shaft (5) extends through the through hole (410) in the tube (41). The shaft (5) has an enlarged head (51) formed on one end thereof. A skirt (511) longitudinally extends from the enlarged head (51) to define a concave portion (510) and a slit (512) is defined in the skirt (511). A through hole (52) is centrally defined in the shaft (5) and communicates with the concave portion (510). A funnel-shaped portion (520) is defined in a bottom of the concave portion (510) and a threaded portion (53) is formed in an inner periphery of the through hole (52). A slot (54) is diametrically defined in the enlarged head (511), wherein the slot (54) extends through the skirt (511) and communicates with the through hole (52) till the threaded portion (53).

An axle (7) has a first end (70) extending into the through hole (52) and connected to the shaft (5). The first end (70) of the axle (7) is threaded and screwed into the threaded portion (53) in the through hole (52). A groove (71) is longitudinally and peripherally defined in the axle (7).

A lever (6) has a first end formed with a cam and pivotally connected to a second end of the axle (7). A pivot hole (60) is laterally defined in the first end of the lever (6). A groove (61) is defined in the first end of the lever (6) and communicates with the pivot hole (60) wherein the groove (61) has a width greater than a diameter of the axle (7). A connector (62) is rotatably received in the pivot hole (60). A receiving hole (62) is diametrically defined in the connector (62) for pivotally receiving the second end of the axle (7).

A fastener (8) is slidably sleeved on the axle (7) and received in the enlarged head (51). The fastener (8) includes a plane portion (81), a tapered portion (80) centrally extending from the plane portion (81) and a hollow insertion (82) co-axially extending from the tapered portion (80), wherein the plane portion (81), the tapered portion (80) and the hollow insertion (82) respectively complementally corresponds to an inner periphery of the enlarged head (51). The hollow insertion (82) is slidable relative to the groove (71). A steel ball (83) is partially received in the groove (71) and a ring (84) is surrounded the hollow insertion (82) to prevent the steel ball (83) from detaching from the groove (71) in the axle (7).

With reference to FIG. 5, the fastener (8) is inwardly moved to expand the enlarged head (51) to make the shaft (5) be secured relative to the tube (41). However, the fork (4) usually has two parallel tubes such that the load for the conventional quick-release device to the fork (4) is unbalance. In addition, the lever (6) of the conventional quick-release device can not drive and rotate the shaft (5) to make the conventional quick-release device quickly detached from the fork (4) such that a unique tool is necessary for rotating the shaft (5). It is inconvenient to rotate and detach the conventional quick-release device from the fork (4).

The present invention has arisen to mitigate and/or obviate the disadvantages of the conventional quick-release device.

SUMMARY OF THE INVENTION

The main objective of the present invention is to provide an improved quick-release device that includes a lever selectively driving a shank thereof for detaching the quick-release device when being released.

To achieve the objective, the quick-release device in accordance with the present invention comprises a shank having a first end extending through a first tube of a fork and be secured in a second tube of the fork, and a flange radially extending from a second end of the shank. A ring is sleeved on the second end of the shank and engaged with the flange. A sleeve is longitudinally connected and engaged to the ring. A through hole is centrally defined in the sleeve. A flange radially extends from an inner periphery of the through hole in the sleeve and divides the through hole in the sleeve into a first section and a second section. A recess is defined in a distal end of the sleeve opposite to the ring. A shaft is co-axially connected to the second end of the shank. The shaft is divided into a first portion and a second portion, wherein the first portion of the shaft is securely mounted into second end of the shank and the second portion of the shaft sequentially extending through the ring and the sleeve. A washer is received in the second section of the through hole in the sleeve and abutting the flange of the sleeve. A through hole is centrally defined in the washer to allow the second portion of the shaft extending therethrough. A pivot is mounted to a distal end of the second portion of the shaft. A lever pivotally mounted onto the pivot. The lever includes a handle selectively engaged into the recess in the sleeve to drive the sleeve for rotating the shank via the ring.

Further benefits and advantages of the present invention will become apparent after a careful reading of the detailed description with appropriate reference to the accompanying drawings.

DETAILED DESCRIPTION OF THE INVENTION

Figure 1:
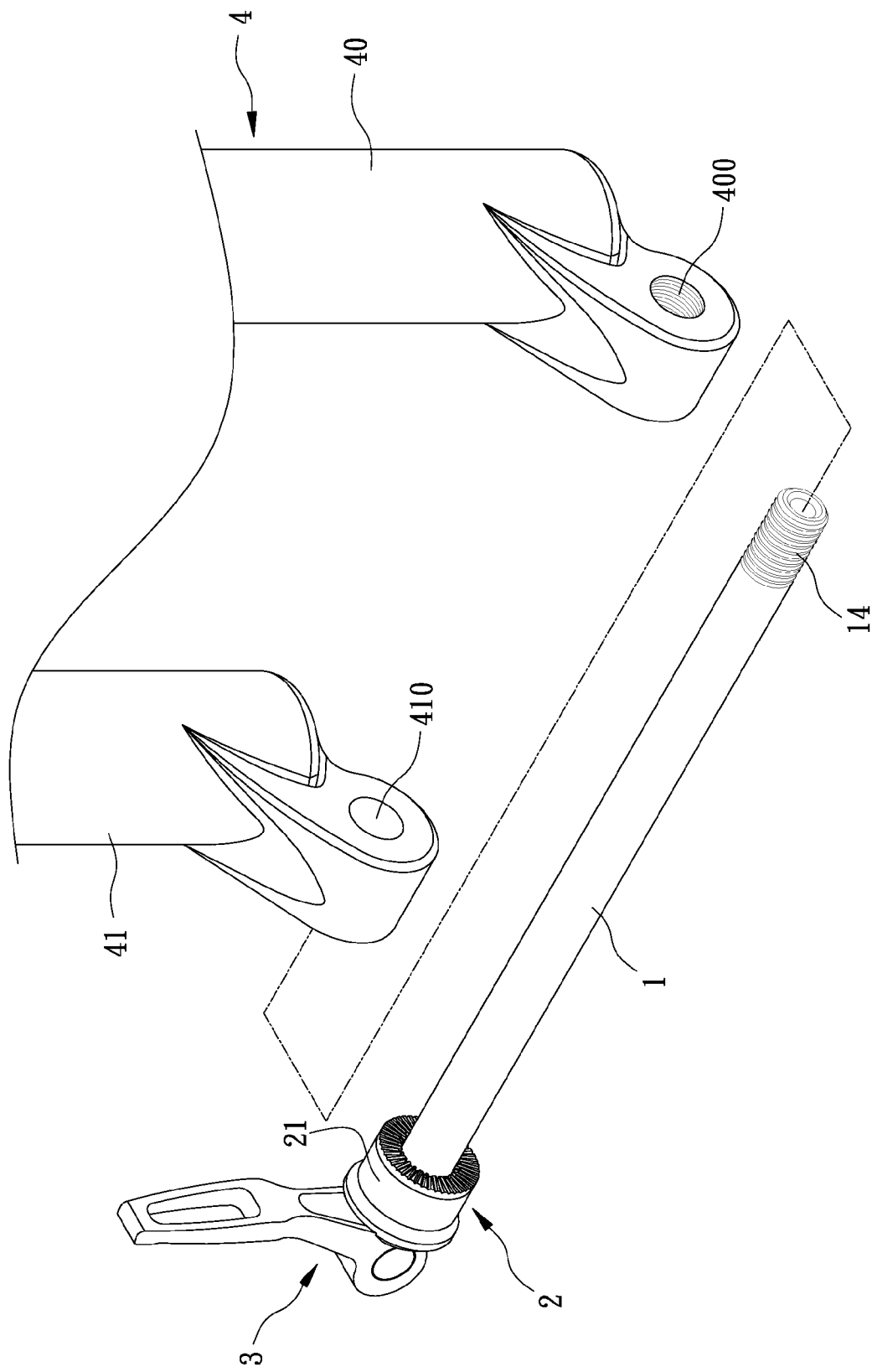
FIG. 1 is a perspective view of a quick-release device in accordance with the present.
Figure 2:
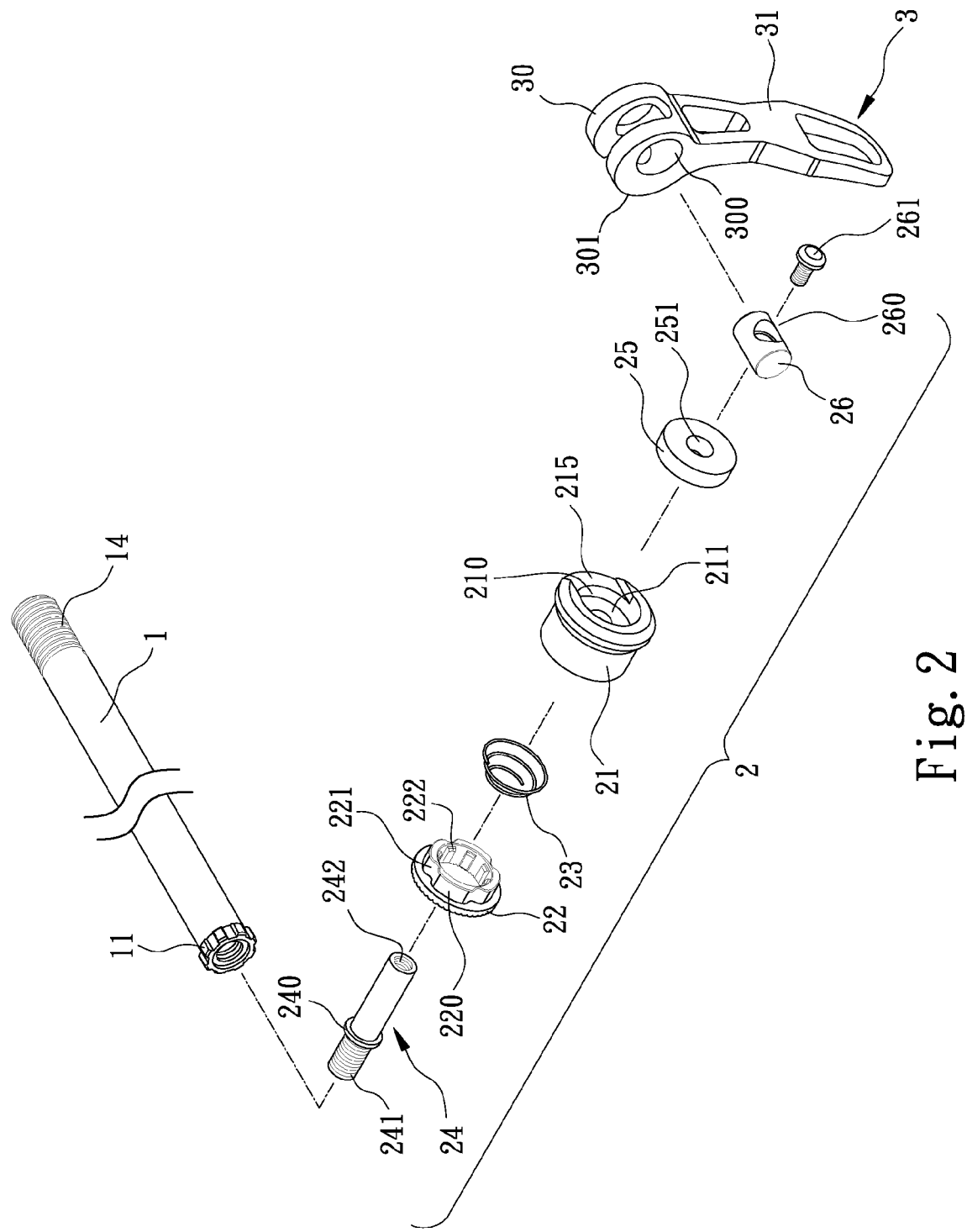
FIG. 2 is an exploded perspective view of the quick-release device in FIG. 1.
Figure 2B:
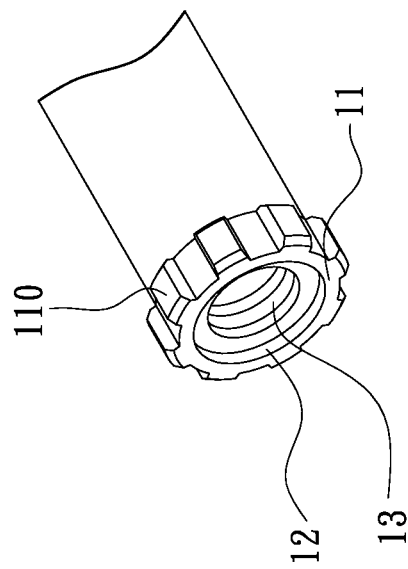
FIG. 2B is a partially enlarged perspective view of the shank of the quick-release device in accordance with the present invention.
Figure 2A:
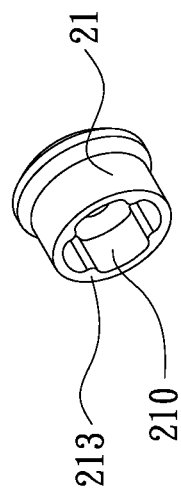
FIG. 2A is another perspective view of the sleeve of the quick-release device in accordance with the present invention.

Referring to the drawings and initially to FIGS. 1-4, a quick-release device in accordance with the present invention is adapted to be mounted on a fork (4) that has a first tube (40) and a second tube (41) parallel to each other, wherein the first tube (40) has a threaded hole (400) transversely defined in a free end thereof and the second tube (41) has a through hole (410) transversely defined in a free end thereof. The threaded hole (400) and the through hole (410) align with each other.

The quick-release device in accordance with the present invention comprises a shank (1), an engaging assembly (2) mounted to a first end of the shank (1) and a lever (3) pivotally connected to the engaging assembly (2).

The shank (1) includes an outer threaded portion (14) formed on a first end and a flange (11) radially extending from a second end thereof. A series of first teeth (110) is peripherally formed on the flange (11) and a through hole (10) is centrally and longitudinally defined in the shank (1). An annular groove (12) is defined in the second end of the shank (1) and communicates with the through hole (10) in the shank (1). An inner threaded portion (13) is peripherally formed on an inner periphery of the through hole (10) in the shank (1) near the annular groove (12).

The engaging assembly (2) includes a ring (22) slidably sleeved on the flange (11) of the shank (1). The ring (22) has a skirt (220) longitudinally extending therefrom opposite to the shank (1) and multiple indentations (221) is peripherally and longitudinally defined in the skirt (220). A series of second teeth (222) is formed in an inner periphery of the skirt (220) and slidably engaged with the series of first teeth (110) such that the ring (22) is slidable and not rotatable relative to the shank (1). A sleeve (21) is longitudinally connected and engaged to ring (22). A through hole (210) is centrally defined in the sleeve (21) and an annular flange (211) radially extending from an inter periphery of the through hole (210) in the sleeve (21) to divide the through hole (210) into a first section and a second section. Multiple ribs (213) longitudinally and peripherally formed on the first section of the through hole (210) in the sleeve (21). Each rib (213) is received in a corresponding one of the multiple indentations (221) such that the sleeve (21) is not slidable relative to the ring (22). A recess (215) is defined in a distal end of the sleeve (21) opposite to the ring (22).

A shaft (24) is co-axially mounted to the second end of the shank (1) and has a flange (240) radially extending therefrom to divide the shaft (24) into a first portion and a second portion, wherein the first portion is securely mounted into the through hole (10) in the shank (1) and the second portion sequentially extending through the ring (22) and the sleeve (21). The flange (240) is received in the annular groove (12) in the shank (1) to prevent the shaft (24) from overly extending into the shank (1). A threaded portion (241) is formed on the first portion of the shaft (24) and screwed into the inner threaded portion (13) of the shank (1). A threaded hole (242) is longitudinally defined in a distal end of the second portion of the shaft (24). A spring (23) is compressively sleeved on the shaft (24). The spring (23) has two opposite ends respectively abutting against the flange (240) of the shaft (24) and the annular flange (211) of the sleeve (21). A washer (25) is received in the second section of the through hole (210) in the sleeve (21). The washer (25) has a central hole (251) defined therein for allowing the shaft (24) extending therethrough. A pivot (26) is transversely mounted to a distal end of the second portion of the shaft (24) after the shaft (24) extending through the washer (25). A sunken hole (260) is diametrically defined therein. A bolt (261) extends through the sunken hole (260) and is screwed into the threaded hole (242) in the shaft (24) to hole the pivot (26) in place.

The lever (3) is pivotally connected to the pivot (26). The lever (3) includes a handle (31) having a pair of ears (30) formed on one end thereof. each ear (30) has a pivot hole (300) defined therein for rotatably receiving two opposite ends of the pivot (26) and a raised portion (301) formed thereon for selectively, inwardly and forcedly pushing the washer (25) when fastening the quick-release device in accordance with the present invention. The handle (31) is selectively engaged into the recess (215) when the quick-release device in accordance with the present invention is released such that the lever (3) can drive sleeve (21) to rotate the ring (22) with the shank (1).

Figure 4:
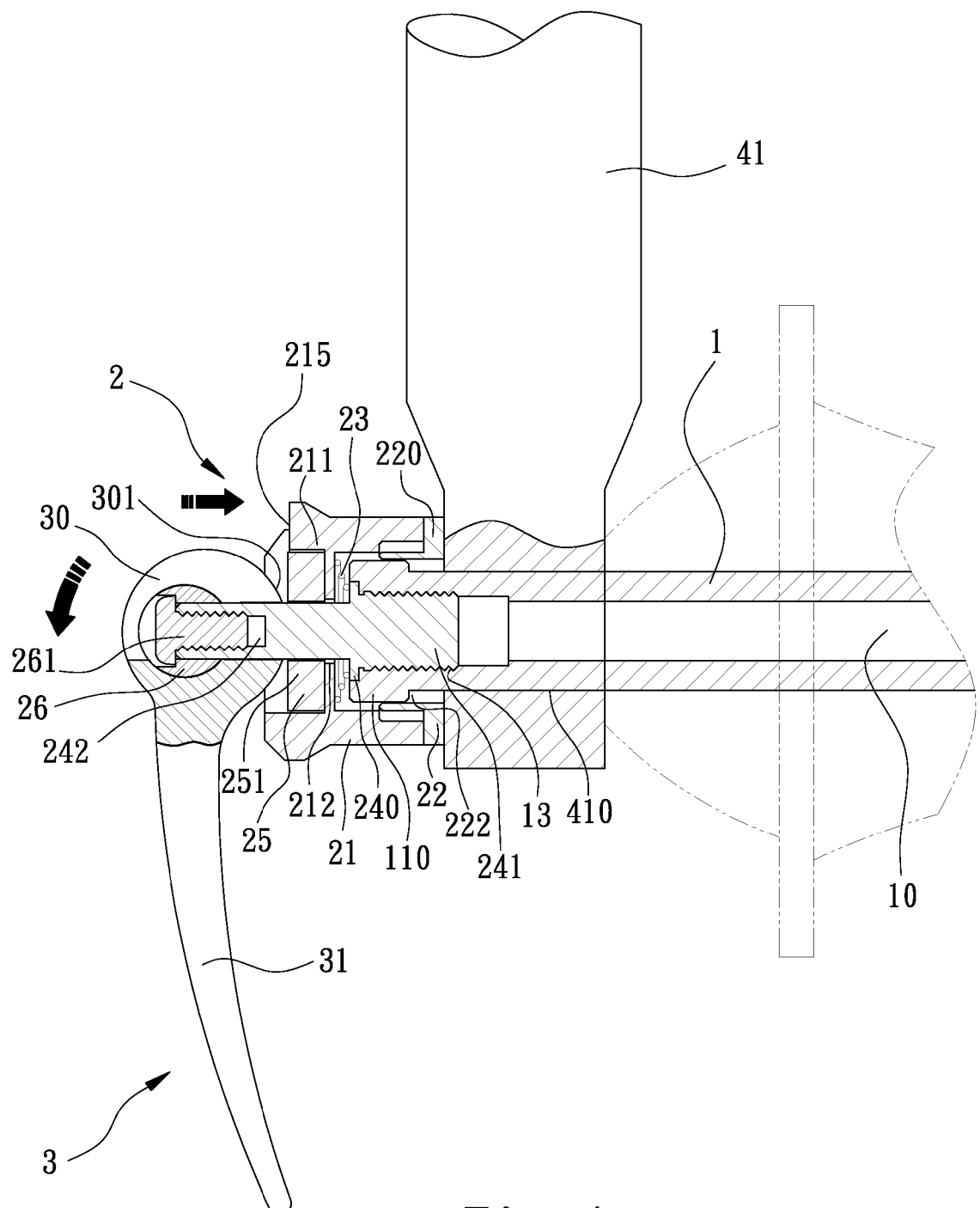
FIG. 4 is a a cross-sectional view of the quick-release device in FIG. 1 when being fastened.
Figure 5:
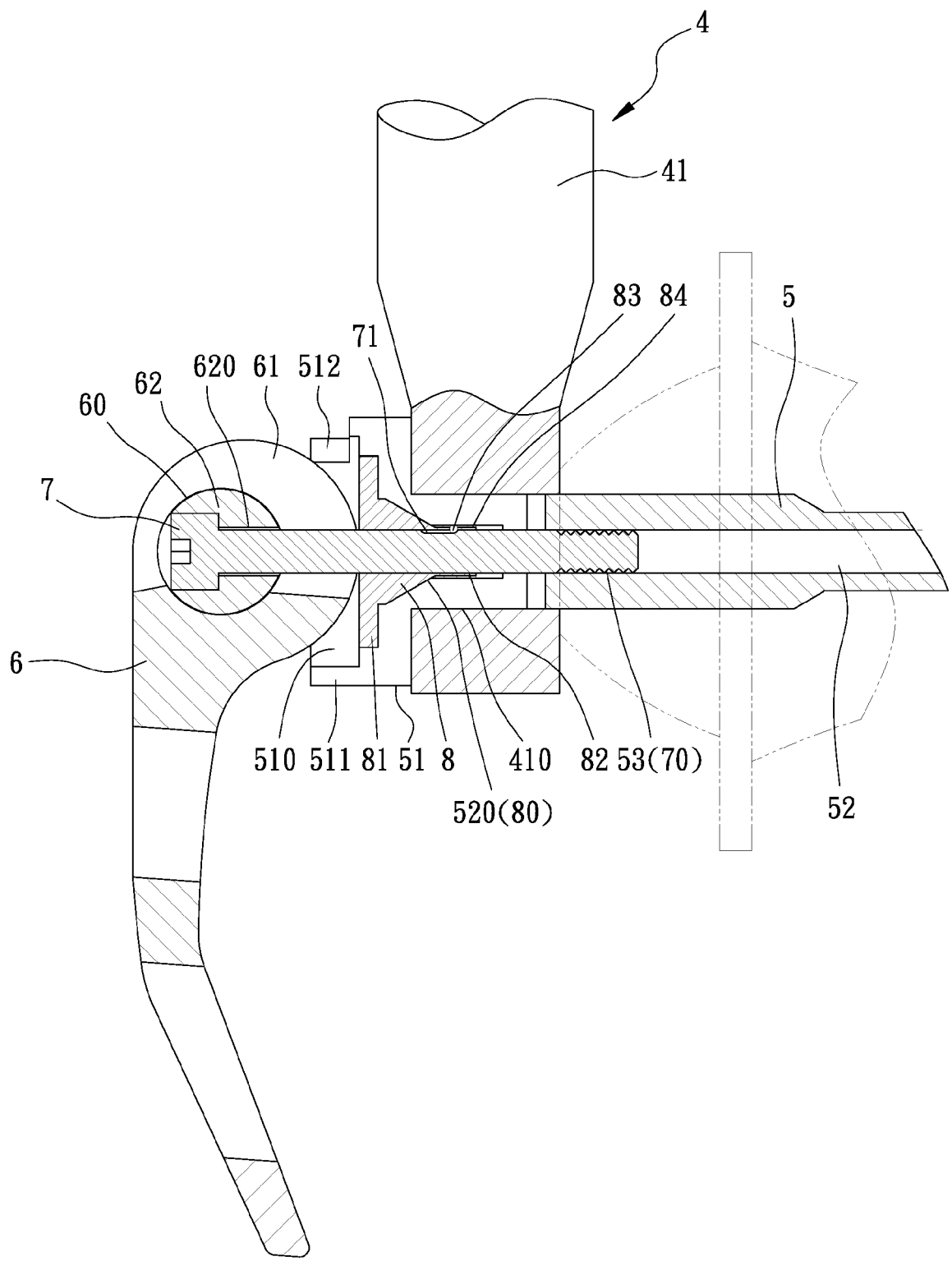
FIG. 5 is a cross-sectional view of a conventional quick-release device in accordance with the prior art when being fastened.
Figure 6:
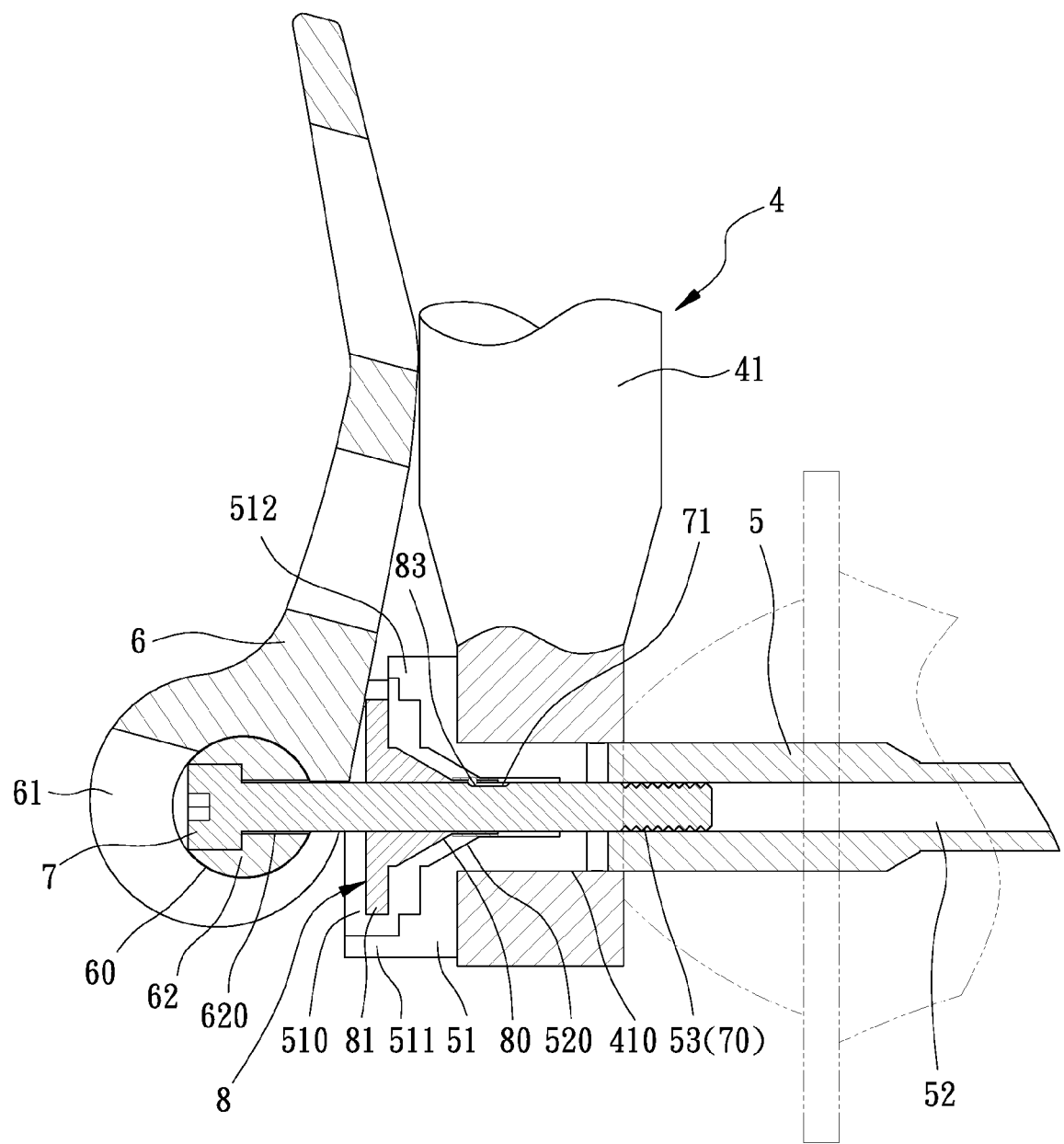
FIG. 6 is a cross-sectional view of the conventional quick-release device in accordance with the prior art when being released.

With reference to FIG. 4, after fastening the quick-release device in accordance with the present invention, the lever (3) is wrenched and disengaged from the recess (215) in the sleeve (21), and the pair of ears (30) is rotated relative to the pivot (26) to make the raised portions (301) forcedly abutting against the washer (25). As a result, the sleeve (21) and the ring (22) is inwardly moved to press the second tube (41) to shorten a distance between the first tube (40) and the second tube (41) to securely fasten an element, such as a hub, between the first tube (40) and the second tube (41). Consequently, the spring (23) is compressed between the flange (240) of the shaft (24) and the annular flange (211) of the sleeve (21), and the lever (3) only abuts the washer (25) such that the lever (3) can be free turned relative to the sleeve (21) to adjust the direction thereof.

Figure 3:
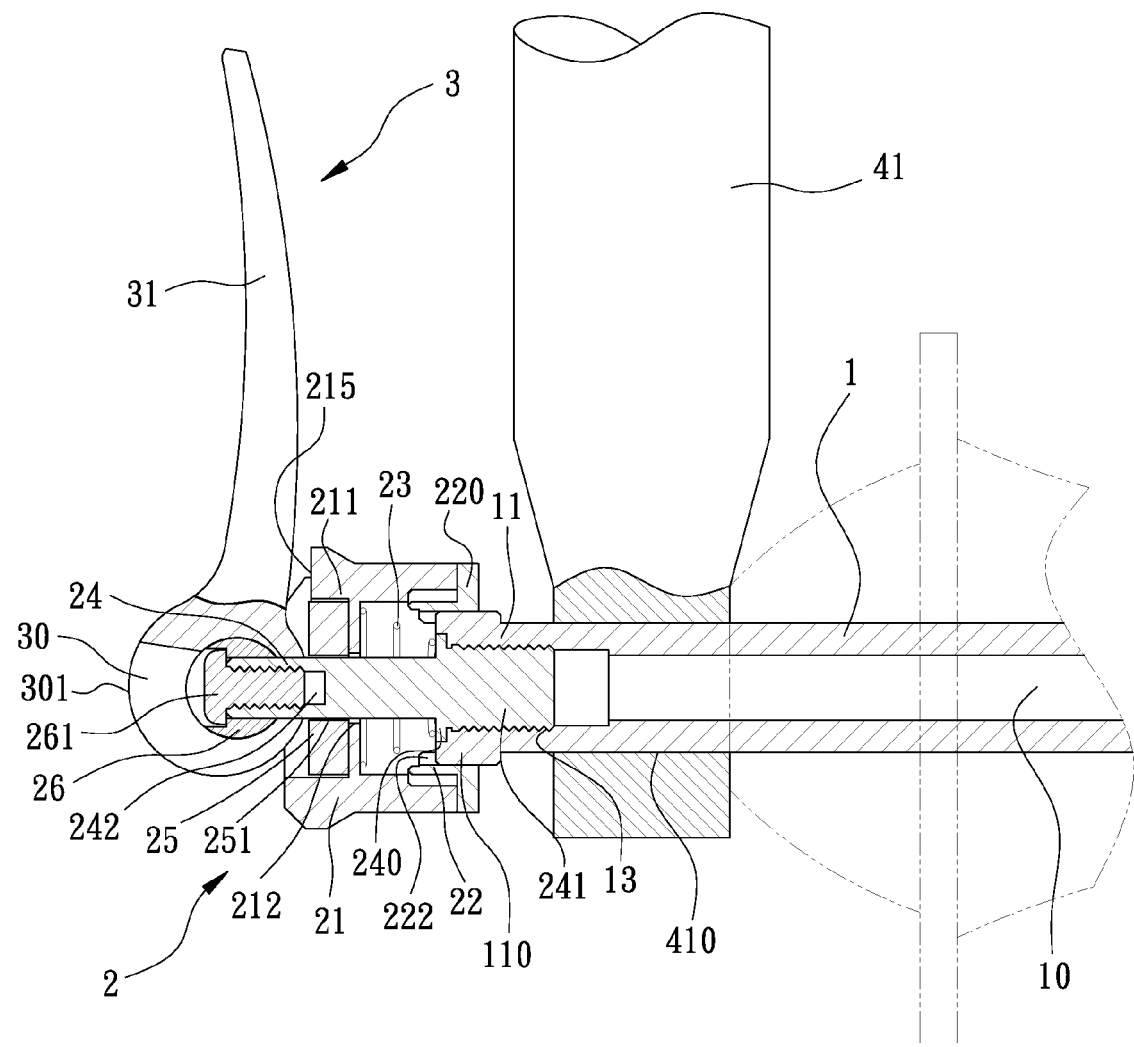
FIG. 3 is a cross-sectional view of the quick-release device in FIG. 1 when being released.

With reference to FIG. 3, after releasing the quick-release device in accordance with the present invention, the lever (3) is wrenched to make the handle (31) engaged into the recess (215) in the sleeve (21), and the sleeve (21) and the ring (22) are moved back to their original positions due to the restitution force of the spring (23). Consequently, the ring (22) can rotate the shank (1) to make the outer threaded portion (14) being separated from the first tube (40) of the fork (4) and quickly detach the quick-release device in accordance with the present invention from the fork (4) when turning the lever (3) to rotate the sleeve (21) with the ring (22) due to the connection between the handle (31) and the recess (215).

Although the invention has been explained in relation to its preferred embodiment, it is to be understood that many other possible modifications and variations can be made without departing from the spirit and scope of the invention as hereinafter claimed.

What is claimed is:

1. A quick-release device comprising:
a shank having a first end adapted to extend through a first tube of a fork and be threadingly secured in a second tube of the fork, and a flange radially extending from a second end of the shank, the flange including first teeth on an outer periphery thereof;
a ring sleeved on the second end of the shank and selectively axially engageable with the flange, the ring including an axially extending skirt, the skirt comprising second teeth on an inner periphery thereof configured to engage the first teeth of the flange, the skirt further comprising indentations on an outer periphery thereof;
a sleeve axially connected and engaged to the ring, the sleeve comprising a through hole centrally defined in the sleeve, and a flange radially extending from an inner periphery of the through hole and dividing the through hole into a first section and a second section, wherein the first section comprises ribs on an inner periphery thereof configured to engage the indentations of the skirt, the sleeve further comprising a recess defined in a distal end of the second section of the sleeve opposite to the ring;

a shaft co-axially connected to the second end of the shank, the shaft divided into a first portion and a second portion, wherein the first portion of the shaft is mounted into second end of the shank and the second portion of the shaft sequentially extends through the ring and the sleeve;

a washer received in the second section of the through hole in the sleeve and abutting the flange of the sleeve, a through hole centrally defined in the washer to allow the second portion of the shaft to extend therethrough;

a pivot mounted to a distal end of the second portion of the shaft; and a lever pivotally mounted onto the pivot, the lever including a handle, the handle including a pair of ears formed on one end of the handle and abutting the washer, each ear having a pivot hole defined therein for rotatably receiving two opposite ends of the pivot, and a cam-shaped raised portion formed on one side thereof;

wherein when the handle is pivoted such that the raised portions of the ears face away from the washer, the handle is engaged with the recess in the sleeve and the second teeth of the ring are engaged with the first teeth of the flange of the shank, such that rotating the lever about the axis of the shank rotates the sleeve, the ring, and the shank, thereby threadingly engaging the first end of the shank into the second tube of the fork; and wherein when the handle is pivoted such that the raised portions of the ears face towards the washer, the sleeve is pushed such that the ring abuts the first tube of the fork.

2. The quick-release device as claimed in claim 1, wherein the shank includes a through hole centrally and longitudinally defined therein.

3. The quick-release device as claimed in claim 2, wherein the shank includes an annular groove defined in the second end thereof and communicating with the through hole therein for receiving the flange of the shaft.

4. The quick-release device as claimed in claim 2, wherein the shank has an inner threaded portion formed on an inner periphery of the through hole in the shank and the first portion of the shaft is threaded and screwed into the inner threaded portion of the shank.

5. The quick-release device as claimed in claim 1, wherein the shank includes an outer threaded portion formed on a first end thereof adapted to screw into the second tube of the fork.

* * * * *